Sept. 12, 1967

L. B. LEONARD 3,341,443

GLASS ELECTRODE WITH METAL FRAME SUPPORT AND METHOD
OF MAKING THEREOF

Filed March 5, 1964

INVENTOR.
LYNN B. LEONARD
BY
*Thomas L. Peterson*
ATTORNEY

United States Patent Office 3,341,443
Patented Sept. 12, 1967

3,341,443
GLASS ELECTRODE WITH METAL FRAME
SUPPORT AND METHOD OF MAKING
THEREOF
Lynn B. Leonard, Fullerton, Calif., assignor to Beckman Instruments, Inc., a corporation of California
Filed Mar. 5, 1964, Ser. No. 349,721
19 Claims. (Cl. 204—195)

ABSTRACT OF THE DISCLOSURE

A glass electrode for ion concentration measurements in which a metal frame supports and defines the configuration of the ion sensitive glass barrier of the electrode.

---

This invention relates to an electrochemical electrode and, more particularly, to those electrochemical electrodes generally referred to as glass electrodes suitable for use in pH measurements and the like and to a method for the manufacture of the same.

Glass electrodes are widely used for measuring the ionic concentration of solutions and commonly comprise a thin bulb of low resistance ion sensitive glass blown or otherwise fixed to the end of a glass supporting tube having high electrical resistance. An ionic reference solution fills the lower end of the glass electrode thereby contacting the inner surface of the thin bulb and an internal half cell element is disposed in the electrode contacting the ionic solution.

For medical purposes it becomes necessary to have glass electrodes of extremely small size for making in vivo measurements of the ionic concentration of body fluids. Heretofore, glass electrodes used for this purpose have been manufactured by utilizing conventional techniques, namely, blowing or otherwise securing a bulb of ion sensitive glass on the end of a glass stem. However, due to the extremely small size electrode that is required the bulb must also be maintained very small which results in bulbs being formed which are relatively thick and therefore have high electrical impedance. The larger the bulbs are blown, the smaller the impedance is and therefore the more desirable the electrochemical characteristics are of the electrode. But in turn the electrode becomes too large for use in physiological applications.

Accordingly, it is the principal object of the present invention to provide an envelope for a glass electrode which is very small in size, is rugged and has a large surface of ion sensitive glass having a low impedance.

Another object of the invention is to provide an envelope for a glass electrode which has a small cross-section yet has a large ion sensitive glass area which is reinforced and consequently has the same structural strength as glass electrodes having the conventional bulb of ion sensitive glass.

According to the principal aspect of the present invention, an envelope for a glass electrode is provided which comprises a hollow tube, a metal frame extending from one end of the tube, and a sleeve of ion sensitive glass sealed to the tube and enclosing the metal frame. The ion sensitive glass is supported by the frame and the frame defines the configuration of the ion sensitive glass. Consequently, any desired configuration of the ion sensitive glass may be provided by merely altering the configuration of the frame attached to the tube of the envelope. By use of the frame, a glass membrane is provided which is thinner and has greater surface area than the bulbous glass membrane formed by conventional methods thereby resulting in a lower impedance and therefore improved electrochemical characteristics. The frame, besides defining the configuration of the ion sensitive glass, structurally reinforces the glass to provide a rugged glass electrode. Although the invention is most suitable for use in miniature electrodes for physiological applications, the principles of this invention may be applied to any conventional-sized glass electrode when it is desired to provide a configuration to the ion sensitive glass other than a bulb and to structurally reinforce the ion sensitive glass.

Other objects, aspects and advantages will become apparent from the following description taken in connection with the accompanying drawing wherein.

Figure 1:
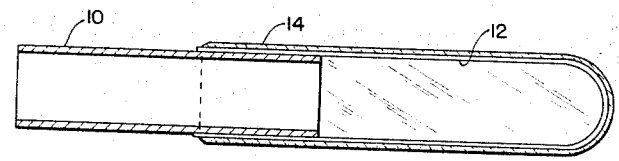
FIG. 1 is a longitudinal sectional view taken through a glass electrode envelope according to one embodiment of the present invention.
Figure 2:
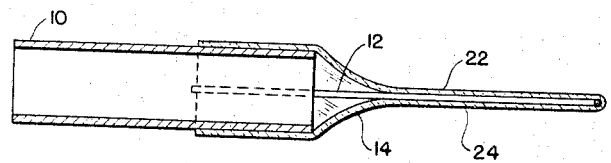
FIG. 2 is a longitudinal sectional view of the envelope illustrated in FIG. 1 and rotated 90°.
Figure 3:
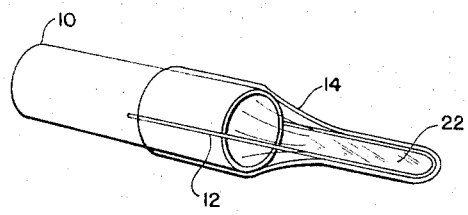
FIG. 3 is an isometric view of the envelope illustrated in FIGS. 1 and 2.

Referring now to FIGS. 1–3 in detail, the main elements of the present invention comprise a hollow tube 10, a metal frame 12 and a sleeve of ion sensitive glass 14. As an exemplary embodiment of the invention, the envelope for a glass electrode illustrated in FIGS. 1–3 will be described as being a miniature envelope for use in micro-electrochemical measurements. The hollow tube 10 for a miniature electrode is preferably formed of platinum; however, other noble metals which are inert to the internal electrolyte solution used in the final glass electrode assembly are suitable. Attached to the hollow tube 10 and extending from the forward end thereof is the metal frame 12 which is shown in the form of a wire loop having a generally U-shaped configuration. Preferably the wire loop is platinum wire which is spot-welded to the hollow tube 10. The wire loop, therefore, forms a metal frame or support upon which the ion sensitive glass 14 is disposed.

Figure 4:
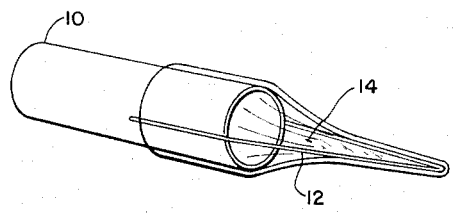
FIG. 4 is a modified form of the envelope disclosed in FIGS. 1–3.
Figure 5:
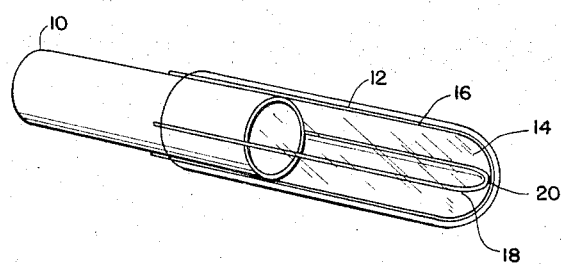
FIG. 5 is a still further modification of the envelope of the invention.

The particular configuration of the metal frame is of no great importance, it merely depends upon the particular use for which the electrode is to be applied. For example, as illustrated in FIG. 4, it is seen that the metal frame may converge toward the forward end thereof to a point so that the electrode is suitable for probing into extremely small areas. Also, as seen in FIG. 5 the metal frame 12 may comprise a pair of wire loops 16 and 18 having a generally U-shaped configuration and joined together at their forward end 20 by fusing the loops together. In each of these cases, the metal frame 12 may be secured to the hollow tube by spot-welding or the like. It is seen that in each of the embodiments disclosed that the metal frame has substantially the same or smaller cross-sectional area than the hollow tube 10. Consequently, the ion sensitive glass 14 which is disposed over the frame in a manner as will be described below is somewhat smaller in cross-sectional area than would be provided if merely a glass bulb were blown from the end of a hollow tube having the same diameter as the tube 10. However, since the metal frame extends a substantial distance forward of the end of the tube 10, the surface area of the glass 14 is substantially large in comparison to the surface area that could be obtained by merely blowing a glass bulb.

The ion sensitive glass is disposed over the frame 12 by drawing a very thin sleeve of ion sensitive glass, thereby having a low impedance across the wall thereof, and by inserting the hollow tube 10 and metal frame 12 therein. Thereafter, sufficient heat is applied to the ion sensitive glass to collapse the glass upon the frame and seal the glass to the platinum tube 10. However, not so much heat should be applied to the glass as would cause the substantially flat parallel walls 22 and 24 of the glass from fusing together between the legs of the loop. Generally a slight tail (not shown) will be left at the end of the metal frame 12 after the glass has been collapsed upon the frame which may be readily removed by applying additional heat to the end of the envelope to melt the tail away. The tail may also be removed by grinding. Thus, it is seen that the method of the invention is extremely simple and provides a rugged reinforced envelope for a glass electrode having a large ion sensitive glass surface, in a small cross-sectional area, and with the ion sensitive glass having a low impedance. Besides the hollow tube 10 meeting the requirement that it is formed of a substance which is inert to the electrolyte solution used in the glass electrode, it must also have a coefficient of expansion which is compatible with coefficient of expansion of the ion sensitive glass 14. When Corning's 015 soda-lime ion sensitive glass is used in the present invention, the coefficient of expansion thereof is sufficiently close to the platinum tube 10 to permit the two members to be securely sealed together upon the application of heat thereto. However, not all ion sensitive glasses and noble metals inert to electrolyte solutions have compatible coefficients of expansion.

Figure 6:
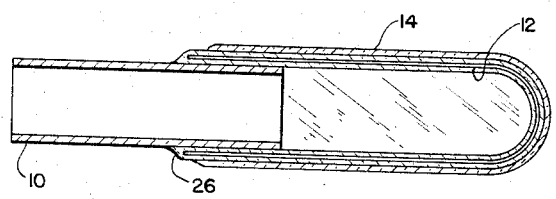
FIG. 6 is a longitudinal sectional view through another form of a glass electrode envelope of the invention.

Thus, for those cases in which the glass 14 and tube 10 are not compatible in that their differences of coefficient of expansion would result in a fragile assembly and in order to more readily form the glass electrode envelope of the invention, a grade glass may be utilized as shown in FIG. 6. A grade glass as referred to herein means a glass that has a coefficient of expansion between that of the tube 10 and the ion sensitive glass 14, consequently permitting a stronger bond to be provided between these elements of the envelope. The grade glass may be provided by first forming a bead of grade glass 26 about the outside surface of the tube 10. The platinum wire loop 12 may be secured to the tube by positioning it in the grade glass when the glass is in molten condition. Also, to aid in the joining of the ion sensitive glass to the frame 12 the grade glass may be utilized to coat the frame 12. Thus, after coating the frame 12 with grade glass, the assembly is inserted into a sleeve of ion sensitive glass 14 which is heated to collapse the ion sensitive glass upon the grade glass coated frame 12 and tube 10.

Figure 7:
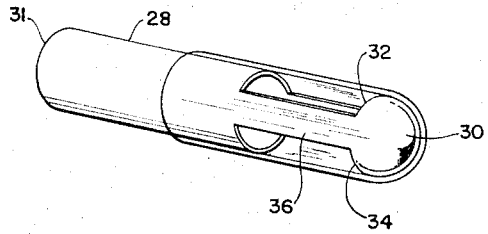
FIG. 7 is an isometric view of still an additional embodiment of the invention.

An additional embodiment of the invention is illustrated in FIG. 7 in which the frame 12 that supports the ion sensitive glass 14 and the tube 10 are integral. In this embodiment, a one-piece supporting tube 28 is provided which is closed at its forward end 30 and open at its rear end 31. As in the prior embodiments of the invention, the tube may be made of platinum or any other noble metal which is inert to the electrolyte solution used in the final glass electrode assembly. Cut in the surface of the tube 28 are a pair of openings 32 and 34 on opposite sides of the tube thereby providing a frame 36 at the forward end of the tube. The particular configuration of the openings and the number of openings which are provided is immaterial to the novel aspects of this embodiment. It is only necessary that sufficient opening space be provided so that there is a large surface area of ion sensitive glass having a low impedance. As in the previous methods, the sleeve of ion sensitive glass 14 is disposed over the end of the tube 28 and heated to collapse and seal the glass onto the tube 28.

Although each of the above embodiments of the invention have been described as utilizing a metal supporting tube 10 which is inert to the internal electrolyte to be used in the final glass electrode assembly, it should be understood that the invention is not limited to the use of such metals. For example, the tube 10 may be formed of a stem glass such as Corning's 0120 or 0010 lead bearing glasses. These glasses are generally referred to as being platinum sealing glasses and, consequently, if a supporting tube is formed of such glasses the metal frame 12 preferably formed of platinum may be readily sealed thereto. Obviously, since these glasses are in themselves grade glasses, there is no requirement for a separate grade glass to be used between the ion sensitive sleeve 14 and the tube 10. However, one limitation to the use of a glass supporting tube 10 is that if the tube is too small it will be closed off when applying heat thereto when sealing the ion sensitive glass to the tube. Consequently, the use of a glass supporting tube 10 for forming an electrode envelope of the type described herein must be limited to tubes which will not collapse upon heating. Thus, the tubes will be somewhat larger than can be used when a platinum tube or the like is used and, therefore, such a structure would be most suitable for conventional sized electrodes. Obviously, a platinum tube 10 will not collapse when merely utilizing sufficient heat to seal the ion sensitive glass 14 thereto. The glass stem 10, however, has the important advantage for use in larger glass electrodes that it is many times less expensive than a platinum tube of the same size.

Figure 8:
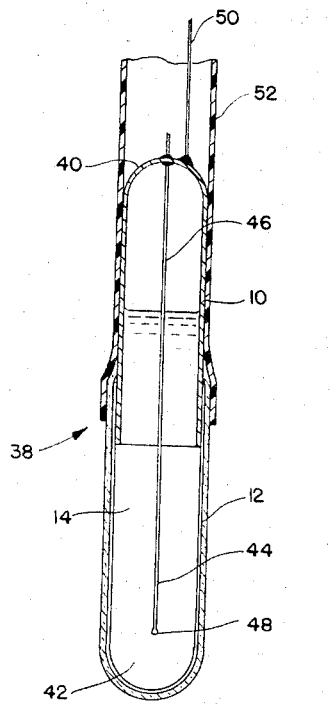
FIG. 8 is a longitudinal sectional view through a complete glass electrode assembly utilizing the envelope of FIGS. 1–3.

The electrode envelope disclosed in FIGS. 1-3 is shown in FIG. 8 as being assembled into a final glass electrode assembly 38. The envelope of the electrode includes the platinum tube 10 which is heated at its rear end 40 to seal it off and includes the metal frame 12 at the forward end having the ion sensitive glass 14 disposed thereover. Within the envelope there is provided an internal electrolyte solution 42 which may be inserted into the envelope either by a hypodermic needle or by first creating a vacuum in the envelope. Also disposed in the envelope is an internal half cell 44 which contacts the electrolyte solution 42. The half cell may comprise a silver wire 46 provided at its end with a silver chloride coating 48. The silver wire 46 extends through the upper closed end 40 of the platinum tube 10 and is sealed therein by heating the area of the tube adjacent to the wire. An electrical conductor 50 has one end connected to the internal half cell 44 through the platinum tube 10 and its other end connected to suitable amplifying equipment (not shown). To insulate the conductor 50 and to isolate the platinum tube 10 from a sample, an insulating sleeve 52 is provided which covers both the exposed portion of the tube 10 and the conductor 50. Suitable insulating material may also be used within the sleeve 52 if desired. The sames type of an electrical arrangement may be provided when using a glass tube 10 rather than platinum tube but such an assembly would differ in that the silver wire 46 would have to be sealed into the closed portion of the glass tube by means of a suitable insulating cement since silver does not readily seal to glass.

An example of a glass electrode envelope which has been constructed according to the embodiment disclosed in FIG. 6 is described as follows. A .400 inch length of platinum tubing having an outer diameter of .030 inch was provided and a platinum sealing glass, Corning's No. 0120, was provided in the form of a bead about the forward end of the platinum tube. The bead was about .020 inch thick. Then a .008 inch platinum wire was bent into a form of a U-shaped loop approximately .300 inch long and about .030 inch wide. The free ends of the platinum wire loop were then sealed to the beaded platinum tubing by heating the sealing glass into a molten condition and inserting the platinum loop therein. Thereafter, a length of Corning's 015 ion sensitive glass was drawn into a very thin tube having a diameter which would permit the reception therein of the platinum tube and loop. The ion sensitive glass tube was drawn thin enough to have an electrical resistance of approximately 50 to 100 megohms across its walls. After inserting the platinum tube and loop into the ion sensitive glass sleeve, the portion of the ion sensitive glass surrounding the sealing glass was heated by means of a flame to seal the ion sensitive glass to the grade glass on the tube. Thereafter, the flame was moved toward the forward end of the platinum wire loop thus causing the ion sensitive glass tube to collapse upon the loop. However, care was taken to prevent the heat from causing the glass sleeve from collapsing and closing off in the center of the loop. The completed electrode envelope was then filled with an electrolyte solution and a .005 inch diameter silver wire dip-coated with silver chloride was positioned therein to contact the solution. The completed electrode assembly was then successfully used in making ion concentration measurements. The electrode was sufficiently rugged for conventional use in microelectrode applications and, due to the large surface area over which the ion sensitive glass was mounted, the glass had a low impedance. However, the cross-sectional area of the glass electrode was relatively small, being no more than about .060 inch in diameter. This is in contrast to the smallest glass electrodes formed by conventional techniques having diameters of approximately .080 to .160 inch. However, these bulbous membranes have much greater impedance than the ion sensitive glass disposed over the frame of the envelope of the present invention.

Although several embodiments of the invention have been disclosed herein for purposes of illustration, it will be understood that other applications of the invention are possible and that the embodiments disclosed may be subject to various changes, modifications and substitutions without necessarily departing from the spirit and scope of the invention as defined by the appended claims.

What is claimed is:
1. In a glass electrode, an envelope adapted to hold an electrolyte, an internal half cell positioned to contact said electrolyte, said envelope comprising:
   a hollow tube formed of a material inert to electrolyte;
   a metal frame inert to electrolyte extending from one end of said tube; and
   a sleeve of ion sensitive glass sealed to said tube and enclosing said metal frame with said frame supportin said glass sleeve and defining the configuration thereof.
2. An envelope as set forth in claime 1 wherein said frame is formed of a noble metal.
3. An envelope as set forth in claim 1 wherein said frame is formed of platinum.
4. An enevelope as set forth in claim 1 wherein said frame comprises a wire loop having its ends sealed to said tube.
5. An envelope as set forth in claim 4 wherein said loop is generally U-shaped.
6. An envelope as set forth in claim 4 wherein said loop tapers to a point at the end opposite said tube.
7. An envelope as set forth in claim 1 wherein said frame comprises a single wire loop having its ends sealed to said tube; and the portion of said glass sleeve enclosing said loop comprises a pair of substantially flat, parallel walls spaced apart by said wire loop.
8. An envelope as set forth in claim 1 wherein said frame comprises a plurality of wire loops each having its ends sealed to said tube and the front portions of said loops joined together.
9. An envelope as set forth in claim 1 wherein said frame has a cross-section substantially the same or smaller than the cross-section of said tube.
10. An envelope as set forth in claim 1 wherein said ion sensitive glass is sealed directly to said tube.
11. An envelope as set forth in claim 1 wherein a grade glass seals said frame and ion sensitive glass to said tube.
12. An envelope as set forth in claim 11 wherein a grade glass coating on said frame seals said ion sensitive glass to said frame.
13. An envelope as set forth in claim 1 wherein said tube is formed of a noble metal.
14. An envelope as set forth in claim 1 wherein said tube is formed of non-ion-sensitive glass.
15. In a glass electrode, an envelope adapted to hold an electrolyte, an internal half cell positioned to contact said electrolyte, said envelope comprising:
   a platinum tube;
   a platinum wire loop having its ends sealed to an end of said tube; and
   a sleeve of ion sensitive glass sealed to said tube and enclosing said wire loop with said wire loop supporting said glass sleeve and defining the configuration thereof.
16. In a glass electrode, an envelope adapted to hold an electrolyte, an internal half cell positioned to contact said electrolyte said envelope comprising:
   a tube of non-ion-sensitive glass;
   a platinum wire loop having its ends sealed to an end of said tube; and
   a sleeve of ion sensitive glass sealed to said tube and enclosing said wire loop with said wire loop supporting said glass sleeve and defining the configuration thereof.
17. A glass electrode comprising:
   a hollow tube having one end open and the other end closed;
   a metal frame extending from said open end of said tube;
   a sleeve of ion sensitive glass enclosing said metal frame with said frame supporting said glass sleeve and defining the configuration thereof;
   an electrolyte within said glass sleeve;
   said metal frame and tube being inert to said electrolyte; and
   an internal half cell sealed into said closed end of said tube and extending into said glass sleeve to contact the electrolyte therein.
18. In a glass electrode, an envelope adapted to hold an electrolyte, an internal half cell positioned to contact said electrolyte, said envelope comprising:
   a hollow metal tube formed of a material inert to electrolyte, said tube being closed at least at one end thereof;
   said tube having at least one opening in the wall thereof adjacent one of said closed ends; and
   a sleeve of ion sensitive glass sealed to said tube and covering said openings.
19. A method of making an envelope for a glass electrode comprising the steps of:
   constructing a tube having a metal frame extending from one end of said tube with said tube and frame being formed of a material inert to electrolyte;
   inserting said tube and frame into a sleeve of ion sensitive glass; and
   heating said glass sleeve sufficiently to seal said sleeve to said tube and to collapse said sleeve upon said frame without said glass sleeve sealing together whereby said frame supports said glass sleeve and defines the configuration thereof.

References Cited

UNITED STATES PATENTS

| | | | |
|---|---|---|---|
| 2,117,596 | 5/1938 | Bender et al. | 204—195 |
| 3,145,157 | 8/1964 | Arthur et al. | 204—195 |
| 3,151,967 | 10/1964 | Zunick | 65—59 |
| 3,216,915 | 11/1965 | Arthur et al. | 204—195 |

FOREIGN PATENTS 509,555   7/1939   Great Britain.

OTHER REFERENCES

Thompson: "Bureau of Standards Journal of Research," vol. 9 (1932), pp. 833–838.

JOHN H. MACK, *Primary Examiner.*

T. H. TUNG, *Assistant Examiner.*